US012768395B2

(12) United States Patent
Gormley

(10) Patent No.: US 12,768,395 B2
(45) Date of Patent: Oct. 20, 2026

(54) LINKAGE DAMPER FOR AIRCRAFT COMPONENT

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 51 days.

(21) Appl. No.: 18/906,933

(22) Filed: Oct. 4, 2024

(65) Prior Publication Data

US 2026/0022732 A1 Jan. 22, 2026

Related U.S. Application Data

(63) Continuation-in-part of application No. 18/774,271, filed on Jul. 16, 2024.

(51) Int. Cl.

*F16C 9/04* (2006.01)
*F02K 1/72* (2006.01)
*F02K 1/76* (2006.01)

(52) U.S. Cl.

CPC .................. *F16C 9/04* (2013.01); *F02K 1/72* (2013.01); *F02K 1/763* (2013.01); *F05D 2220/323* (2013.01); *F05D 2260/50* (2013.01); *F05D 2260/96* (2013.01)

(58) Field of Classification Search

CPC ... F16C 9/04; F02K 1/72; F02K 1/763; F05D 2220/323; F05D 2260/50; F05D 2260/96

See application file for complete search history.

(56) References Cited

U.S. PATENT DOCUMENTS

| | | | | |
|---|---|---|---|---|
| 4,605,186 | A | 8/1986 | Fernz | |
| 8,876,018 | B2 | 11/2014 | Vauchel | |
| 10,024,270 | B2 | 7/2018 | Kelford | |
| 2014/0030007 | A1 * | 1/2014 | Le Jeune | F16C 11/0666 403/127 |
| 2023/0029052 | A1 * | 1/2023 | Valleroy | F02K 1/625 |
| 2023/0059782 | A1 | 2/2023 | Cazuc | |
| 2025/0223029 | A1 * | 7/2025 | Laitenberger | B64C 27/35 |

OTHER PUBLICATIONS

"Seals-it Rod End Seals WS37506PK", https://www.summitracing.com/parts/sit-ws37506pk, May 29, 2024.

* cited by examiner

*Primary Examiner* — Phutthiwat Wongwian
*Assistant Examiner* — Rene D Ford
(74) *Attorney, Agent, or Firm* — Getz Balich LLC

(57) ABSTRACT

An apparatus is provided for an aircraft. This aircraft apparatus includes a link, a spherical bearing, a damper and a fastener. The link extends longitudinally from a first end of the link to a second end of the link. The link includes a receptacle at the first end of the link. The spherical bearing is disposed within the receptacle. The spherical bearing includes a race element and a ball element. The race element is radially between and engages the ball element and the link. The damper includes a damper ring and an outer spacer ring that is bonded to the damper ring. The damper ring axially engages the ball element at an inner peripheral region of the damper ring. The damper ring axially engages the link at an outer peripheral region of the damper ring through the outer spacer ring. The fastener projects through the spherical bearing and the damper.

20 Claims, 12 Drawing Sheets

LINKAGE DAMPER FOR AIRCRAFT COMPONENT

This application claims priority to and is a continuation-in-part of U.S. patent application Ser. No. 18/774,271 filed Jul. 16, 2024, which is hereby incorporated herein by reference in its entirety.

BACKGROUND

1. Technical Field

This disclosure relates generally to an aircraft and, more particularly, to a linkage for the aircraft such as a thrust reverser draglink or a mounting link.

2. Background Information

An aircraft includes various linkages such as draglinks for a thrust reverser. Various types and configurations of aircraft linkages are known in the art. While these known aircraft linkages have various benefits, there is still room in the art for improvement.

SUMMARY OF THE DISCLOSURE

According to an aspect of the present disclosure, an apparatus is provided for an aircraft. This aircraft apparatus includes a link, a spherical bearing, a damper and a fastener. The link extends longitudinally from a first end of the link to a second end of the link. The link includes a receptacle at the first end of the link. The spherical bearing is disposed within the receptacle. The spherical bearing includes a race element and a ball element. The race element is axially aligned with the ball element along an axis. The race element circumscribes the ball element. The race element is radially between and engages the ball element and the link. The damper includes a damper ring and an outer spacer ring that is bonded to the damper ring. The damper ring axially engages the ball element at an inner peripheral region of the damper ring. The damper ring axially engages the link at an outer peripheral region of the damper ring through the outer spacer ring. The fastener projects through the spherical bearing and the damper.

According to another aspect of the present disclosure, another apparatus is provided for an aircraft. This aircraft apparatus includes a link, a spherical bearing, a damper and a fastener. The link extends longitudinally from a first end of the link to a second end of the link. The link includes a receptacle at the first end of the link. The spherical bearing is disposed within the receptacle. The spherical bearing includes a race element and a ball element. The race element circumscribes the ball element and radially engages the link. The damper includes an inner ring, an outer ring and an intermediate ring connecting the inner ring to the outer ring. The inner ring is abutted against the ball element. The outer ring is abutted the link. The intermediate ring is configured from or otherwise includes elastomeric material. The fastener projects through the spherical bearing and the damper.

According to still another aspect of the present disclosure, another apparatus is provided for an aircraft. This aircraft apparatus includes a link, a spherical bearing, a damper and a fastener. The link extends longitudinally from a first end of the link to a second end of the link. The link includes a receptacle at the first end of the link. The spherical bearing is disposed within the receptacle. The spherical bearing includes a race element and a ball element. The race element is axially aligned with the ball element along an axis. The race element circumscribes the ball element. The race element is radially between and is abutted against the ball element and the link. The damper includes a damper ring and an outer spacer ring that is welded to the damper ring. The damper ring axially engages the ball element independent of the outer spacer ring. The damper ring axially engages the link through the outer spacer ring. The fastener projects through the spherical bearing and the damper.

The damper may also include an inner spacer ring. The damper ring may axially engage the ball element through the inner spacer ring independent of the outer spacer ring. The damper ring may axially engage the link through the outer spacer ring independent of the inner spacer ring.

The damper ring may be configured from or otherwise include elastomeric material.

The damper ring may be configured from or otherwise include metal.

The damper ring may extend uninterrupted radially from an inner end of the damper ring to an outer end of the damper ring. The damper ring may extend uninterrupted circumferentially around the axis.

The damper ring may include a plurality of apertures arranged circumferentially about the axis.

A first of the apertures may be disposed radially within and may extend axially through the damper ring.

A first of the apertures may project radially into and may extend axially through the damper ring at the inner peripheral region of the damper ring.

The outer spacer ring may be axially between and abutted against the link and the outer peripheral region of the damper ring.

The inner peripheral region of the damper ring may be abutted against the ball element.

The damper may also include an inner spacer ring bonded to the damper ring. The damper ring may axially engage the ball element at the inner peripheral region of the damper ring through the inner spacer ring.

The inner spacer ring may be axially between and abutted against the ball element and the inner peripheral region of the damper ring.

At least one of the outer spacer ring or the inner spacer ring may be configured from or otherwise include metal.

An inner diameter of the outer spacer ring may be larger than an outer diameter of the inner spacer ring.

The outer spacer ring may be configured from or otherwise include metal.

The aircraft apparatus may also include a thrust reverser blocker door. The fastener may mount the ball element to the thrust reverser blocker door.

The aircraft apparatus may also include an engine case. The fastener may mount the ball element to the engine case.

The aircraft apparatus may also include an engine pylon. The fastener may mount the ball element to the engine pylon.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
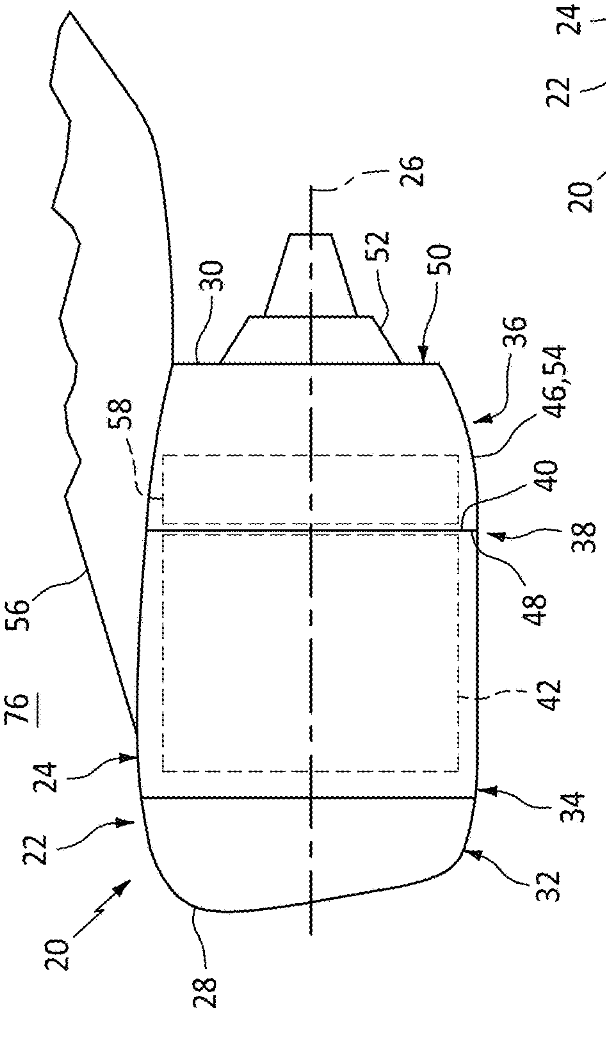
FIG. 1 is a schematic illustration of an aircraft propulsion system with a thrust reverser in a stowed position.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 includes a gas turbine engine and a nacelle 22.

The gas turbine engine is configured to power operation of the aircraft propulsion system 20. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the aircraft propulsion system 20 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

The nacelle 22 is configured to house and provide an aerodynamic cover for the gas turbine engine. An outer structure 24 of the nacelle 22 (e.g., an outer fixed structure (OFS)) extends along an axis 26 from a forward end 28 of the nacelle 22 and its outer structure 24 to an aft end 30 of the nacelle outer structure 24. Briefly, the axis 26 may be a centerline axis of the nacelle 22 and/or one or more of its members such as the nacelle outer structure 24. The axis 26 may also or alternatively be a centerline axis of the gas turbine engine. The nacelle outer structure 24 of FIG. 1 includes an inlet structure 32, one or more fan cowls 34 (one such fan cowl visible in FIG. 1) and an aft structure 36, which aft structure 36 is configured as part of or otherwise includes a thrust reverser 38 (see also FIG. 2).

The inlet structure 32 is disposed at the nacelle forward end 28. The inlet structure 32 is configured to direct a stream of air through an inlet opening at the nacelle forward end 28 and into a fan section of the gas turbine engine.

The fan cowls 34 are disposed axially between the inlet structure 32 and the aft structure 36. Each fan cowl 34 of FIG. 1, for example, is disposed at (e.g., on, adjacent or proximate) an aft end 40 of a stationary portion of the nacelle 22, and extends axially forward to the inlet structure 32. Each fan cowl 34 is generally axially aligned with the fan section of the gas turbine engine. The fan cowls 34 are configured to provide an aerodynamic covering over a fan case 42 for the fan section. Briefly, this fan case 42 circumscribes a fan rotor in the fan section and may partially form a forward outer peripheral boundary of a bypass flowpath 44 (see FIG. 3) of the aircraft propulsion system 20.

The term "stationary portion" is used above to describe a portion of the nacelle 22 that is stationary during aircraft propulsion system operation (e.g., during takeoff, aircraft flight and landing). However, the stationary portion may be otherwise movable for aircraft propulsion system inspection/maintenance; e.g., when the aircraft propulsion system 20 is non-operational. Each of the fan cowls 34, for example, may be configured to provide access to components of the gas turbine engine such as the fan case 42 and/or peripheral equipment configured therewith for inspection, maintenance and/or otherwise. In particular, each fan cowl 34 may be pivotally mounted with the aircraft propulsion system 20 by, for example, a pivoting hinge system. Alternatively, the fan cowls 34 and the inlet structure 32 may be configured into a single axially translatable body for example. The present disclosure, of course, is not limited to the foregoing fan cowl configurations and/or access schemes.

The aft structure 36 includes a translating sleeve 46 for the thrust reverser 38. The translating sleeve 46 of FIG. 1 is disposed at the outer structure aft end 30. This translating sleeve 46 extends axially along the axis 26 between a forward end 48 of the translating sleeve 46 and the outer structure aft end 30. The translating sleeve 46 is configured to partially form an aft outer peripheral boundary of the bypass flowpath 44 (see FIGS. 3 and 4). The translating sleeve 46 may also be configured to form a bypass nozzle 50 for the bypass flowpath 44 with an inner structure 52 of the nacelle 22 (e.g., an inner fixed structure (IFS)), which nacelle inner structure 52 houses a core (e.g., a gas generator) of the gas turbine engine.

The translating sleeve 46 of FIG. 1 includes a pair of sleeve segments 54 (e.g., halves) arranged on opposing sides of the aircraft propulsion system 20 (one such sleeve segment visible in FIG. 1). The present disclosure, however, is not limited to such an exemplary translating sleeve configuration. For example, the translating sleeve 46 may alternatively have a substantially tubular body. For example, the translating sleeve 46 may extend more than three-hundred and thirty degrees (330°) around the axis 26.

Figure 2:
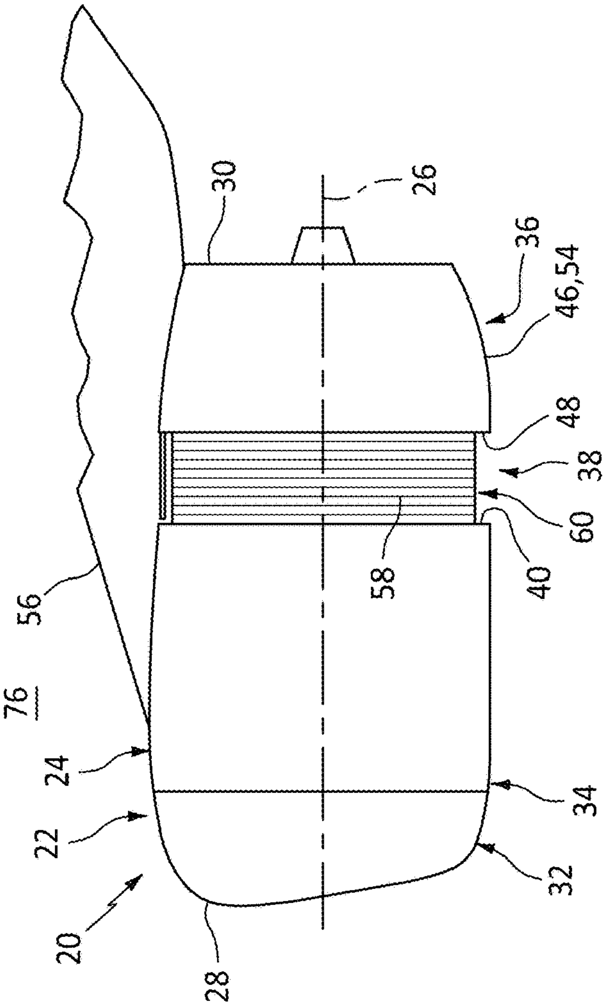
FIG. 2 is a schematic illustration of the aircraft propulsion system with the thrust reverser in a deployed position.

Referring to FIGS. 1 and 2, the translating sleeve 46 is an axially translatable structure. Each translating sleeve segment 54, for example, may be slidably connected to one or more stationary structures (e.g., a pylon 56 and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 46 may translate axially along the axis 26 and relative to the stationary portion and the nacelle inner structure 52. The translating sleeve 46 may thereby move axially along the axis 26 between a forward stowed position (e.g., see FIG. 1) and an aft deployed position (e.g., see FIG. 2). In the sleeve stowed position of FIG. 1, the translating sleeve 46 provides the functionality described above. In the sleeve deployed position of FIG. 2, the translating sleeve 46 at least partially (or substantially completely) uncovers at least one or more components of the thrust reverser 38 such as, but not limited to, a fixed cascade structure 58 disposed in a thrust reverser passage 60. In addition, as the translating sleeve 46 moves from the sleeve stowed position to the sleeve deployed position, one or more components of the thrust reverser 38 such as, but not limited to, one or more blocker door assemblies 62 may be deployed from their stowed position (e.g., see FIG. 3) to their deployed position (e.g., see FIG. 4) to divert bypass air from the bypass flowpath 44 and through the cascade structure 58 to provide reverse thrust.

The blocker door assemblies 62 may be arranged circumferentially about the axis 26 in one or more arcuate arrays; e.g., where the bypass flowpath 44 has a D-duct configuration. Alternatively, the blocker door assemblies 62 may be arranged circumferentially about the axis 26 in a substantially annular array; e.g., where the bypass flowpath 44 has an O-duct configuration. Each blocker door assembly 62 may be configured as an exposed drag link type door assembly. Each blocker door assembly 62 of FIGS. 3 and 4, for example, includes a blocker door 64 and a door actuation linkage 66. Briefly, the door actuation linkage 66 is configured to actuate pivoting and/or other movement of the blocker door 64 between and to its stowed position of FIG. 3 and its deployed position of FIG. 4.

The blocker door 64 extends longitudinally between and to a first end 68 of the blocker door 64 and a second end 70 of the blocker door 64. This blocker door 64 is pivotally coupled to the translating sleeve 46 at or near the door first end 68. With this arrangement, the blocker door 64 is configured to pivot and/or otherwise move between its stowed position of FIG. 3 and its deployed position of FIG. 4.

Figure 3:
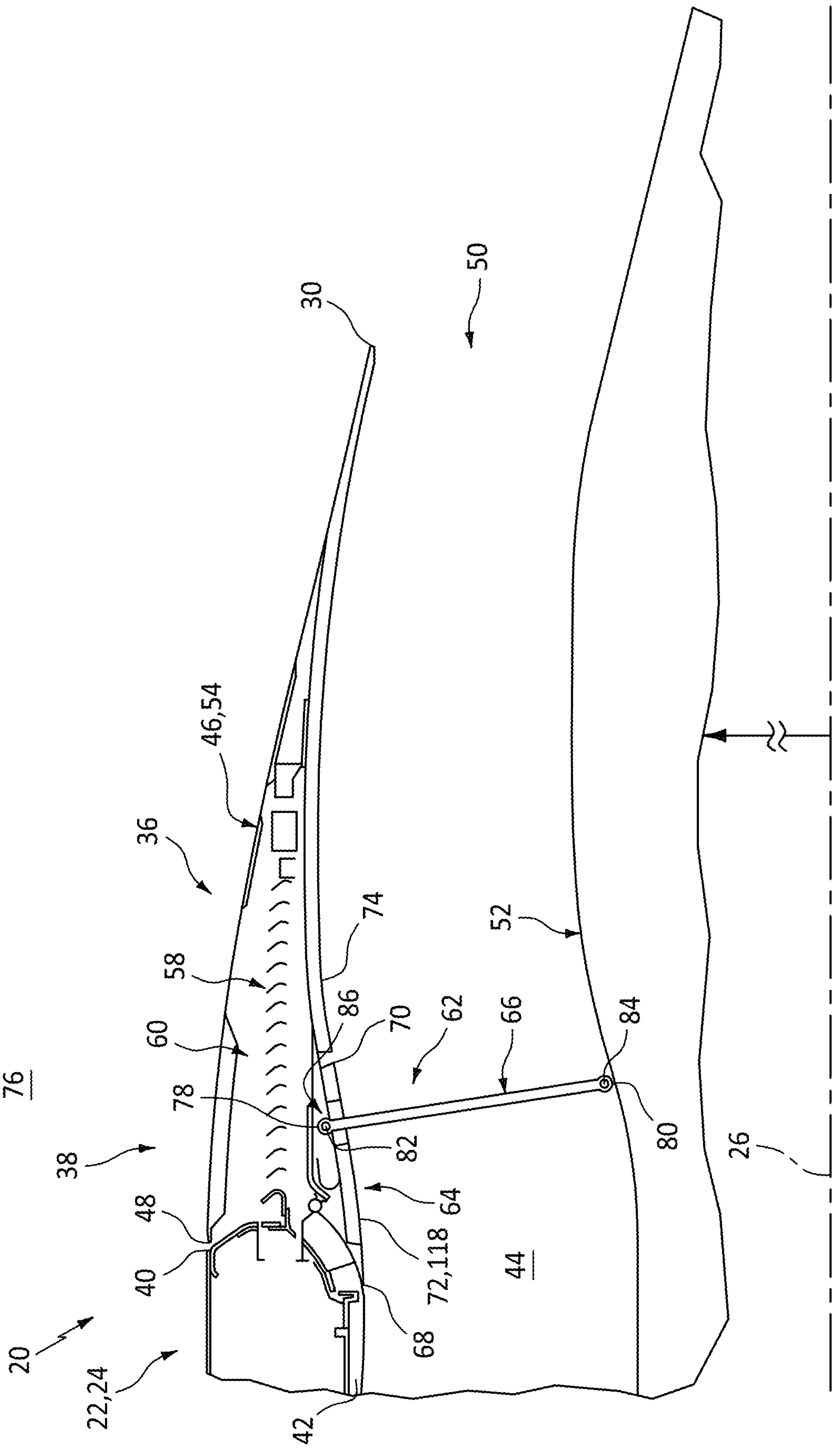
FIG. 3 is a partial schematic illustration of the aircraft propulsion system with its thrust reverser in a stowed arrangement.

When the blocker door 64 is in its stowed position of FIG. 3, the door first end 68 is a forward, upstream end of the blocker door 64 and the door second end 70 is an aft, downstream end of the blocker door 64. Here, the blocker door 64 is disposed outside of (e.g., next to and radially outboard of) the bypass flowpath 44. A side surface 72 of the blocker door 64 of FIG. 3, for example, forms a radial outer peripheral boundary of a respective portion of the bypass flowpath 44. This door side surface 72 may also be arranged flush with a radial inner surface 74 of the translating sleeve 46 and a respective one of its translating sleeve segments 54.

Figure 4:
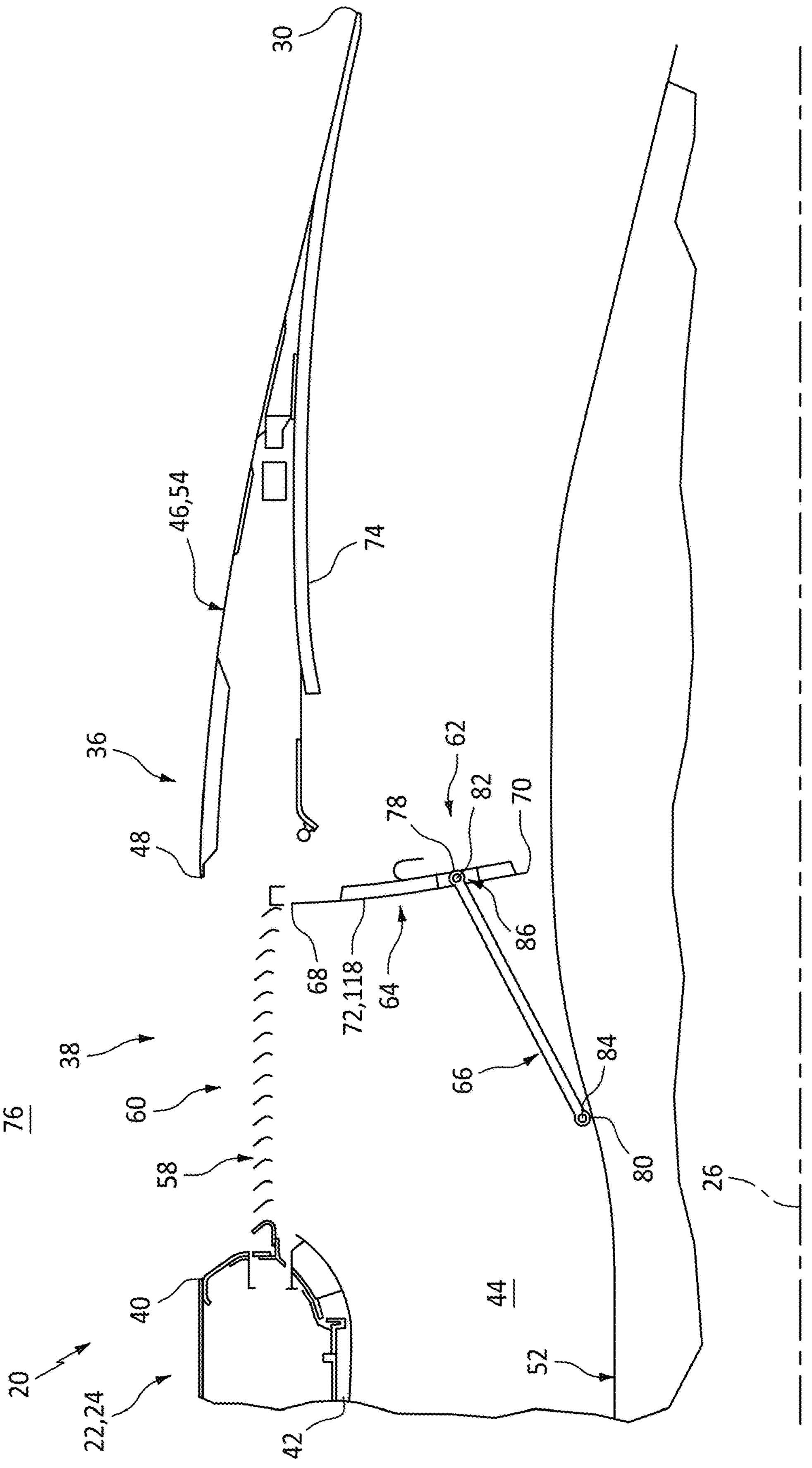
FIG. 4 is a partial schematic illustration of the aircraft propulsion system with its thrust reverser in a deployed arrangement.

When the blocker door 64 is in its deployed position of FIG. 4, the door first end 68 is a radial outer end of the blocker door 64 and the door second end 70 is a radial inner end of the blocker door 64. Here, the blocker door 64 is disposed in the bypass flowpath 44. The blocker door 64 of FIG. 4, for example, projects radially inward (e.g., towards the axis 26) into and substantially across the bypass flowpath 44. With this arrangement, the blocker door 64 and its side surface 72 are configured to block off a downstream portion of the bypass flowpath 44 and redirect air flowing in an upstream portion of the bypass flowpath 44 radially outward. Briefly, the downstream portion of the bypass flowpath 44 is a portion of the bypass flowpath 44 downstream of the deployed blocker door 64, and the upstream portion of the bypass flowpath 44 is a portion of the bypass flowpath 44 upstream of the deployed blocker door 64. The air redirected by the blocker door 64 flows radially outward (e.g., away from the axis 26) through the cascade structure 58 and the respective thrust reverser passage 60 into an environment 76 external to the aircraft propulsion system 20. The cascade structure 58 may further redirect the air flowing therethrough such that the air directed into the external environment 76 by the thrust reverser 38 follows a trajectory with an axial forward component to provide reverse thrust.

The door actuation linkage 66 of FIGS. 3 and 4 is configured as a single draglink. The door actuation linkage 66 of FIGS. 3 and 4, for example, extends longitudinally from a first end 78 of the door actuation linkage 66 to a second end 80 of the door actuation linkage 66. The door actuation linkage 66 is pivotally and/or otherwise movably coupled to the blocker door 64 at the linkage first end 78, and at an intermediate location between the first door first end 68 and the door second end 70. Here, an outer pivot axis 82 at the coupling between the door actuation linkage 66 and the blocker door 64 is a moveable pivot axis in that the location of the outer pivot axis 82 moves as the blocker door 64 moves between its stowed position of FIG. 3 and its deployed position of FIG. 4. The door actuation linkage 66 is pivotally and/or otherwise movably coupled to the nacelle inner structure 52 at the linkage second end 80. Here, an inner pivot axis 84 at the coupling between the door actuation linkage 66 and the nacelle inner structure 52 is a stationary pivot axis in that the location of the inner pivot axis 84 does not move as the blocker door 64 moves between its stowed position of FIG. 3 and its deployed position of FIG. 4. With this arrangement, the door actuation linkage 66 extends radially across the bypass flowpath 44 when the blocker door 64 is in its stowed position.

During operation of the thrust reverser 38, the door actuation linkage 66 operatively links the translating movement of the translating sleeve 46 to the pivoting movement of the blocker door 64. For example, as the translating sleeve 46 translates axially aft from its stowed position of FIG. 3 to its deployed position of FIG. 4, the translating sleeve 46 pulls the outer pivot axis 82 axially aft. However, since the inner pivot axis 84 is stationary, the door actuation linkage 66 pulls the blocker door 64 and its door second end 70 radially inward into the bypass flowpath 44. This motion may then be reversed when the translating sleeve 46 translates axially forward from its deployed position of FIG. 4 to its stowed position of FIG. 3.

Referring to FIG. 3, when the thrust reverser 38 is stowed, the bypass air flows longitudinally through the bypass flowpath 44 and along the stowed blocker door assemblies 62 to the bypass nozzle 50. Within the bypass flowpath 44, the bypass air impinges against and flows around each door actuation linkage 66. This interaction with each door actuation linkage 66 may subject that door actuation linkage 66 to bypass air induced vibrations. Each door actuation linkage 66 may also be subject to vibrations in the nacelle inner structure 52 and/or the aft structure 36 and its members 46, 64. Such vibrations may be detrimental to hardware 86 (e.g., a spherical bearing, a pin connection, etc.) coupling each door actuation linkage 66 to the respective blocker door 64. Each blocker door assembly 62 of FIG. 5 therefore is configured with at least (or only) one linkage damper 88 (e.g., a snubber) for damping vibrations in the respective door actuation linkage 66.

Figure 6:
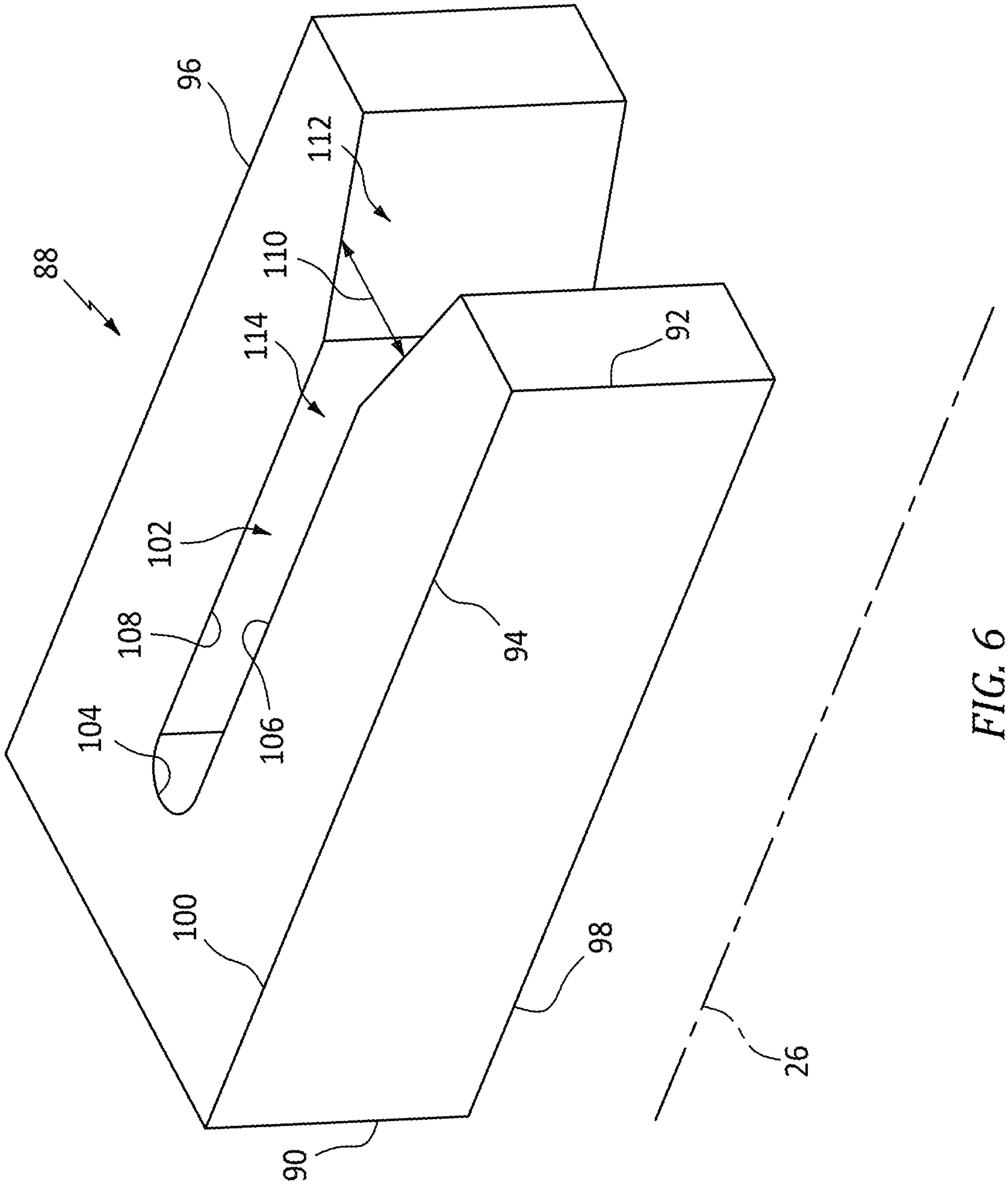
FIG. 6 is a perspective illustration of the damper.

Referring to FIG. 6, the linkage damper 88 extends axially along the axis 26 from an axial first end 90 of the linkage damper 88 to an axial second end 92 of the linkage damper 88. The damper first end 90 may be a forward, upstream end of the linkage damper 88, and the damper second end 92 may be an aft, downstream end of the linkage damper 88; e.g., with respect to flow through the bypass flowpath 44 with the thrust reverser 38 stowed (see FIG. 3). The linkage damper 88 extends laterally (e.g., circumferentially or tangentially) between and to opposing lateral first and second sides 94 and 96 of the linkage damper 88. The linkage damper 88 extends radially (relative to the axis 26) from a radial inner side 98 of the linkage damper 88 to a radial outer side 100 of the linkage damper 88.

The linkage damper 88 is configured with a linkage receptacle 102; e.g., a slot. This linkage receptacle 102 may be configured as a slot, a groove or another aperture formed within the linkage damper 88. The linkage receptacle 102 of FIG. 6, for example, projects axially into the linkage damper 88 from the damper second end 92 to an axial distal end 104 of the linkage receptacle 102. The linkage receptacle 102 extends laterally within the linkage damper 88 between and to opposing lateral first and second sides 106 and 108 of the linkage receptacle 102. The linkage receptacle 102 extends radially through (or partially into) the linkage damper 88 from the damper inner side 98 to (or towards) the damper outer side 100.

The linkage receptacle 102 may be configured with a flared end at the damper second end 92. The linkage receptacle 102 of FIG. 6, for example, has a lateral width 110 measured between the receptacle first and second sides 106 and 108. This receptacle width 110 (e.g., continuously and/or uniformly) decreases as a first portion 112 of the linkage receptacle 102 projects axially into the linkage damper 88 from the damper second end 92 to a second portion 114 of the linkage receptacle 102. The receptacle width 110 along the receptacle second portion 114, on the other hand, may be substantially or completely uniform; e.g., constant. Here, an axial length of the receptacle second portion 114 is (e.g., 1.5×, 2×, 3×) longer than an axial length of the receptacle first portion 112. The present disclosure, however, is not limited to such an exemplary linkage receptacle 102.

The linkage damper 88 may be constructed from elastomeric material. Examples of the elastomeric material include, but are not limited to, rubber, silicon, foam or composite material. In the arrangement of FIG. 6, the elastomeric material forms an entirety of the linkage damper 88 including its linkage receptacle 102. It is contemplated, however, the elastomeric material may alternatively also include a frame or a housing to provide additional support for the elastomeric material. Additionally, it is contemplated the linkage damper 88 may include a flexible covering (e.g., a cloth covering made from fiberglass or another composite material) to reduce friction and/or wear between the linkage damper 88 and the door actuation linkage 66 engaged by the linkage damper 88.

Figure 5:
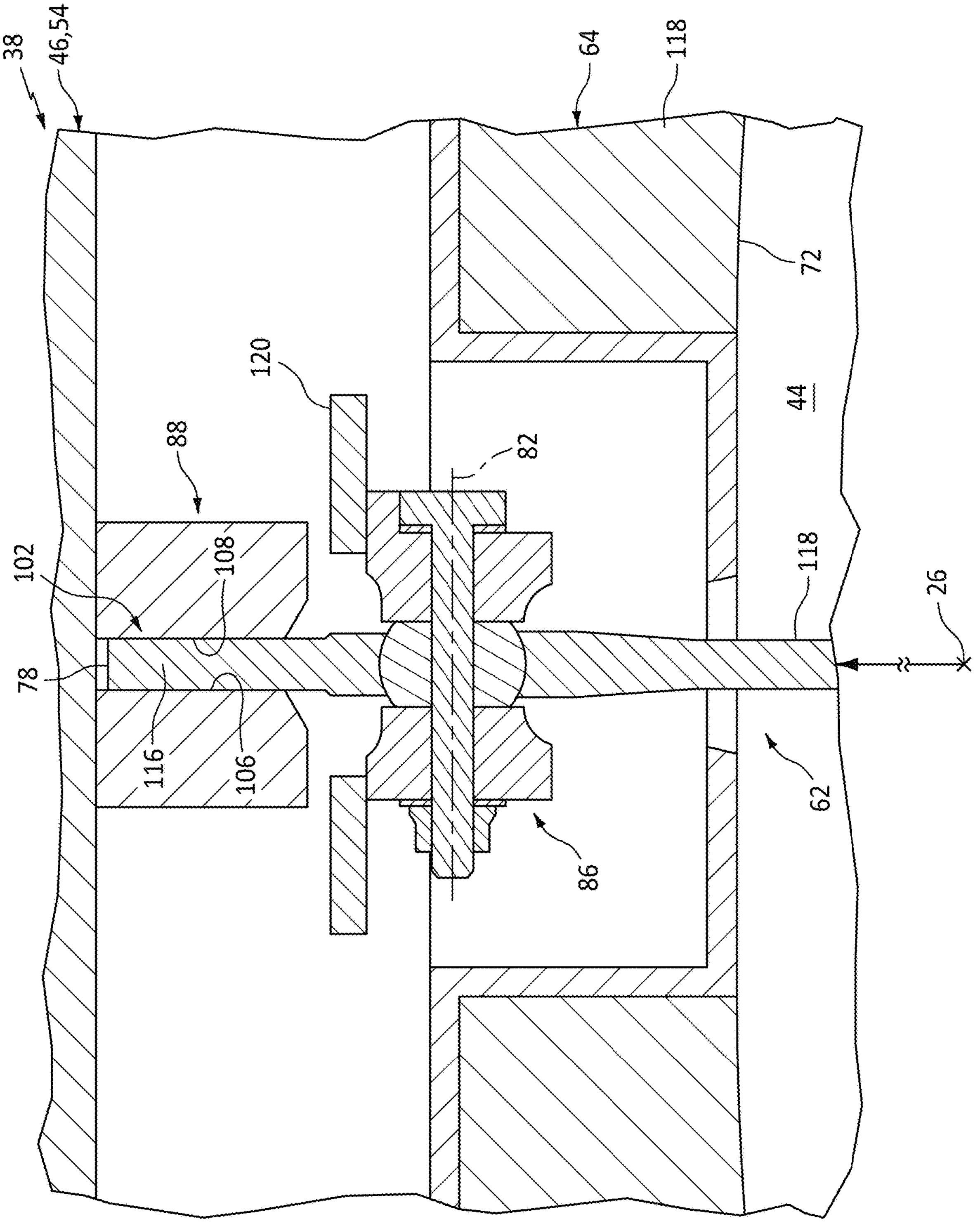
FIG. 5 is a partial cutaway illustration of the thrust reverser at an interface between a damper and a linkage.

Referring to FIG. 5, the linkage damper 88 is mounted and fixed to the translating sleeve 46. The linkage damper 88, for example, may be mechanically fastened to the translating sleeve 46 by one or more fasteners; e.g., bolts, rivets, etc. The linkage damper 88 may alternatively, or also, be bonded (e.g., adhered) and/or otherwise attached to the translating sleeve 46.

Figure 7A:
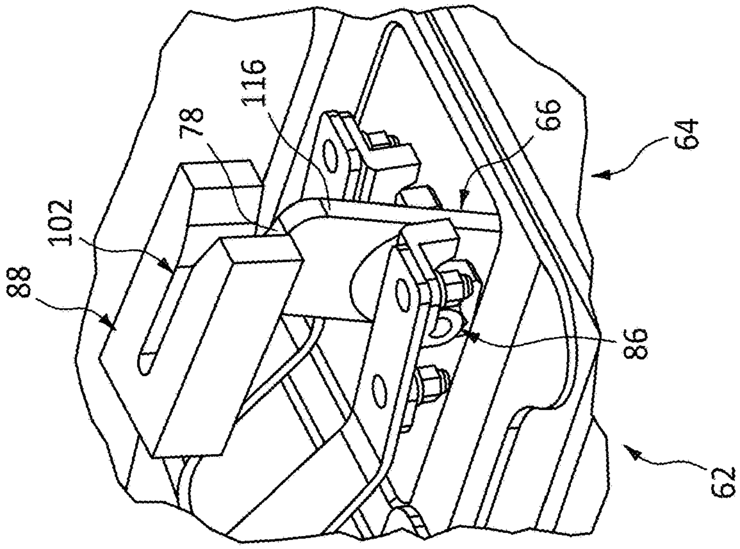
FIGS. 7A-C are partial perspective illustrations depicting mating of the linkage with the damper.
Figure 7B:
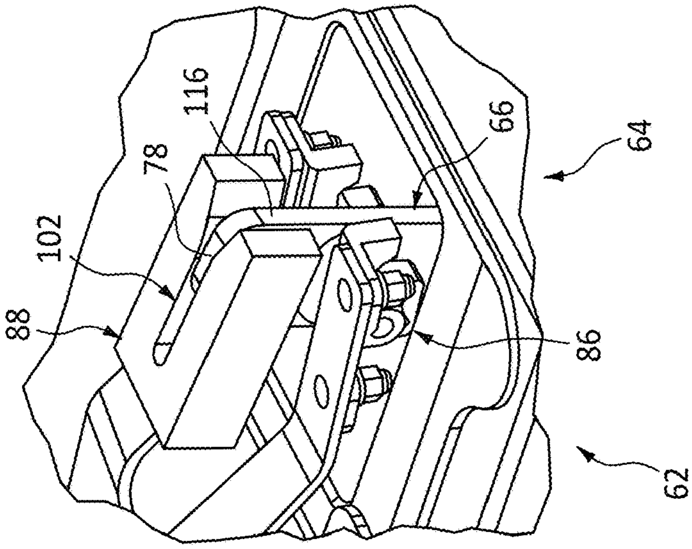
Figure 7C:
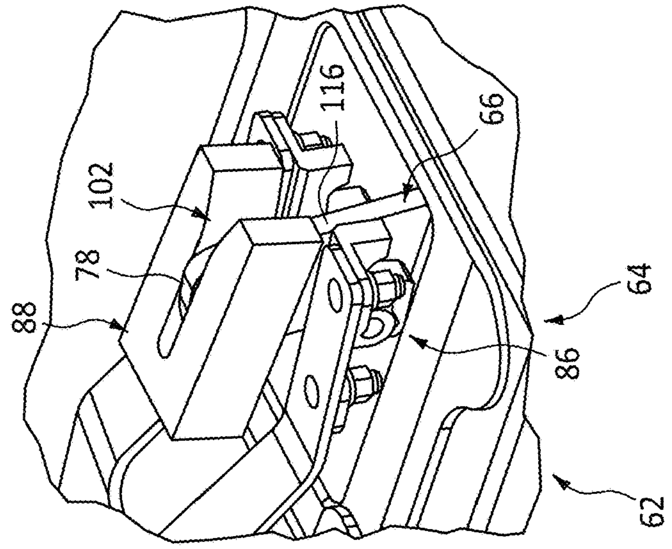

Referring to FIGS. 7A-C, as the blocker door 64 moves into its stowed position (see FIG. 7C), each door actuation linkage 66 is mated with a respective one of the linkage dampers 88. A longitudinal end portion 116 of each door actuation linkage 66 at the linkage first end 78, for example, slides into the respective linkage receptacle 102 until the linkage end portion 116 is seated within the respective linkage receptacle 102. While seated in the linkage receptacle 102, the linkage end portion 116 may laterally engage the receptacle first side 106 and/or the receptacle second side 108 (see FIG. 5). The linkage end portion 116 of FIG. 5, for example, may be (e.g., slightly) laterally squeezed within the linkage receptacle 102 between the opposing receptacle first and second sides 106 and 108. With this arrangement, the linkage end portion 116 may remain in lateral engagement (e.g., contact) with the respective linkage damper 88. The elastomeric material of the respective linkage damper 88 may thereby be operable to damp vibrations in the respective door actuation linkage 66 at least at its linkage first end 78. Here, the linkage damper 88 of FIG. 5 is disposed adjacent (e.g., slightly radially outboard of) the hardware 86 coupling the respective door actuation linkage 66 to the respective blocker door 64. The linkage damper 88 of FIG. 5 therefore is operable to reduce vibrational loads imparted onto the hardware 86 while the respective blocker door 64 is stowed.

Figure 8:
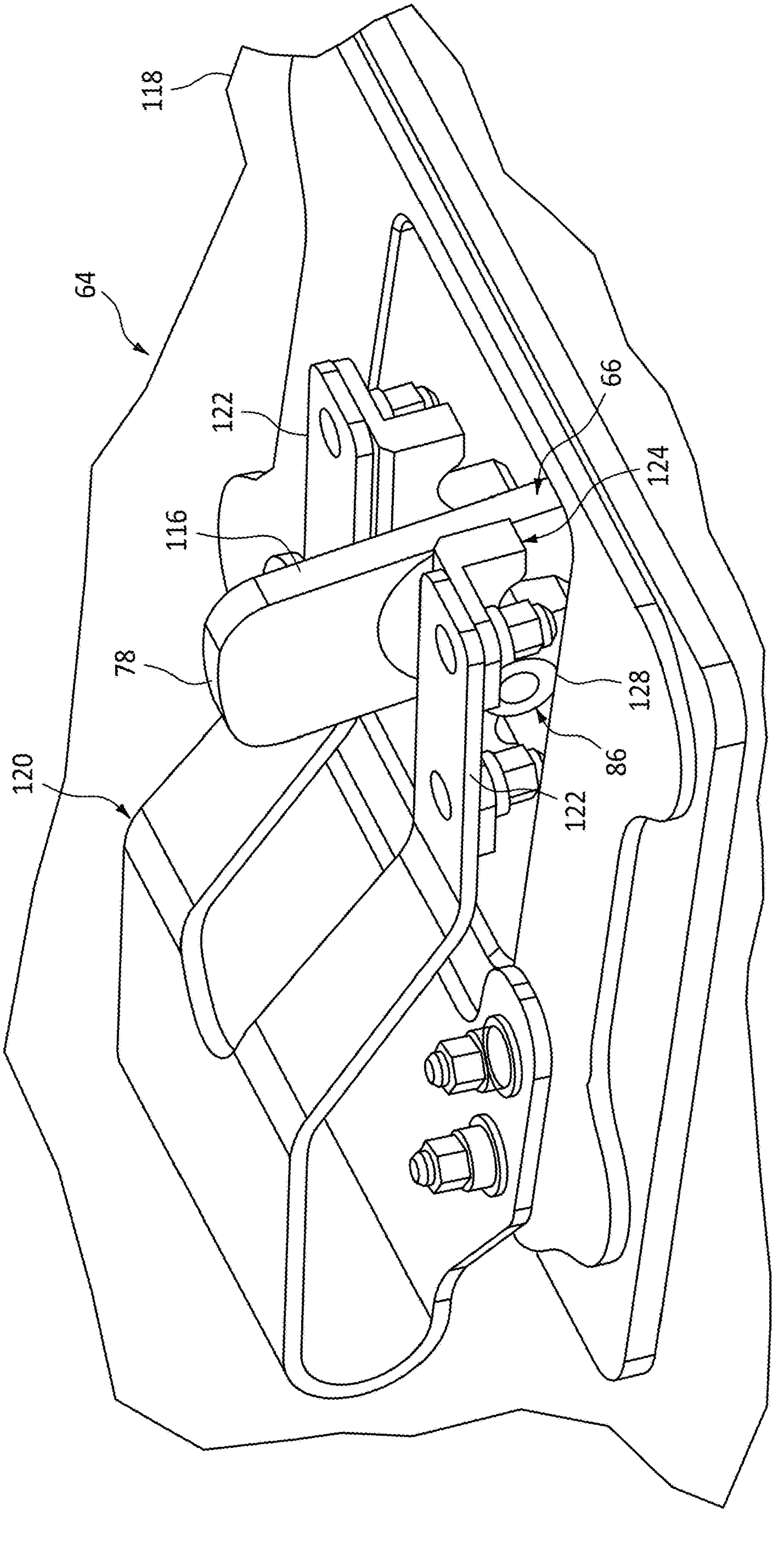
FIG. 8 is a partial perspective illustration of the linkage coupled to a panel of the blocker door by a flexible mounting device.

Referring to FIG. 8, each blocker door 64 may include a door panel 118 and a mounting device 120. Referring to FIGS. 3 and 4, the door panel 118 extends longitudinally between and to the door first end 68 and the door second end 70. The door panel 118 extends laterally between and to opposing lateral sides of the respective blocker door 64. The door panel 118 includes and forms the side surface 72. Referring again to FIG. 8, the mounting device 120 is configured to facilitate mounting the respective door actuation linkage 66 to the door panel 118. This mounting device 120 may be a flexible mounting device and/or a lost motion device. The mounting device 120 of FIG. 8, for example, includes a cantilevered spring member with one or more axially extending mounting flanges 122. The respective door actuation linkage 66 is attached to the mounting flanges 122 through the hardware 86, and disposed laterally between the mounting flanges 122.

Figure 9:
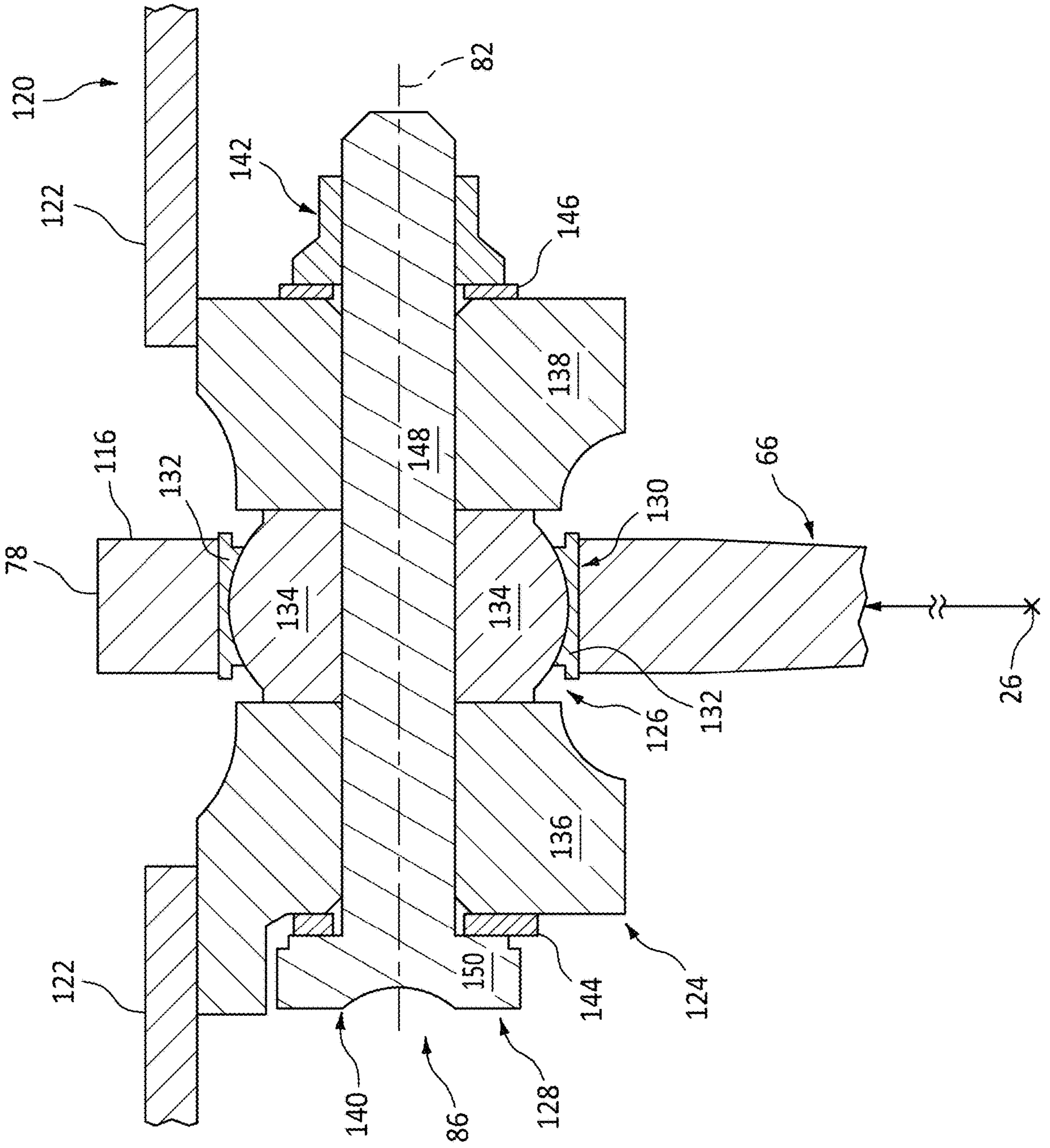
FIG. 9 is a partial sectional illustration of hardware coupling the linkage to the flexible mounting device.

Referring to FIG. 9, the hardware 86 may include a clevis mount 124, a spherical bearing 126 and a fastener assembly 128. The clevis mount 124 is fixed to the mounting device 120 and its mounting flanges 122. The clevis mount 124, for example, may be mechanically fastened to the mounting device 120 and its mounting flanges 122 by one or more fasteners; sec FIG. 8.

The spherical bearing 126 of FIG. 9 is disposed within a bearing receptacle 130 (e.g., a through hole) in the respective door actuation linkage 66 at or about the linkage first end 78. The spherical bearing 126 of FIG. 9 includes an annular race element 132 and an annular ball element 134. The race element 132 is disposed within the bearing receptacle 130 and is mounted (e.g., press fit and/or otherwise attached) to the respective door actuation linkage 66. The ball element 134 is disposed within an annular channel of the race element 132, where an inner surface of the race element 132 circumscribes and radially engages (e.g., contacts) an outer surface of the ball element 134. Here, the ball element 134 is configured to move within the race element 132.

The spherical bearing 126 is disposed laterally between flanges 136 and 138 of the clevis mount 124. The spherical bearing 126 and its ball element 134 are mounted to the clevis mount 124 by the fastener assembly 128. The fastener assembly 128 of FIG. 8, for example, includes a fastener 140 (e.g., a bolt) and a nut 142. The fastener assembly 128 may also include one or more washers 144 and/or 146. A shank 148 of the fastener 140 projects axially along the respective outer pivot axis 82 through the first mount flange 136, the ball element 134 and the second mount flange 138 to a distal end of the fastener 140. A head 150 of the fastener 140 engages the first mounting flange 136, for example, through the first washer 144 or alternatively directly. The nut 142 is threaded onto the shank 148 at the distal end. The nut 142 engages the second mounting flange 138, for example, through the second washer 146 or alternatively directly. With this arrangement, the hardware members 136, 126 and 138 are captured between the head 150 and the nut 142. The present disclosure, however, is not limited to such an exemplary hardware arrangement.

In some embodiments, referring to FIG. 7C, each linkage damper 88 engages (e.g., contacts) the respective door actuation linkage 66 when the respective blocker door 64 is stowed. However, when the respective blocker door 64 is deployed, the respective door actuation linkage 66 is pulled out of the respective linkage receptacle 102. Each door actuation linkage 66 therefore may be disengaged from the respective linkage damper 88 when the respective blocker door 64 is deployed. In other embodiments, referring to FIG. 10, each blocker door assembly 62 may be configured with one or more annular linkage dampers 88' which maintain engagement with the respective door actuation linkage 66 as the blocker door 64 moves between its stowed position and its deployed position (see FIGS. 3 and 4). Note, while the linkage dampers 88' are shown in FIG. 10 as an alternative to inclusion of the linkage damper 88 of FIG. 7C, it is contemplated each blocker door assembly 62 may alternatively be configured with both types of linkage dampers 88 and 88'.

Figure 10:
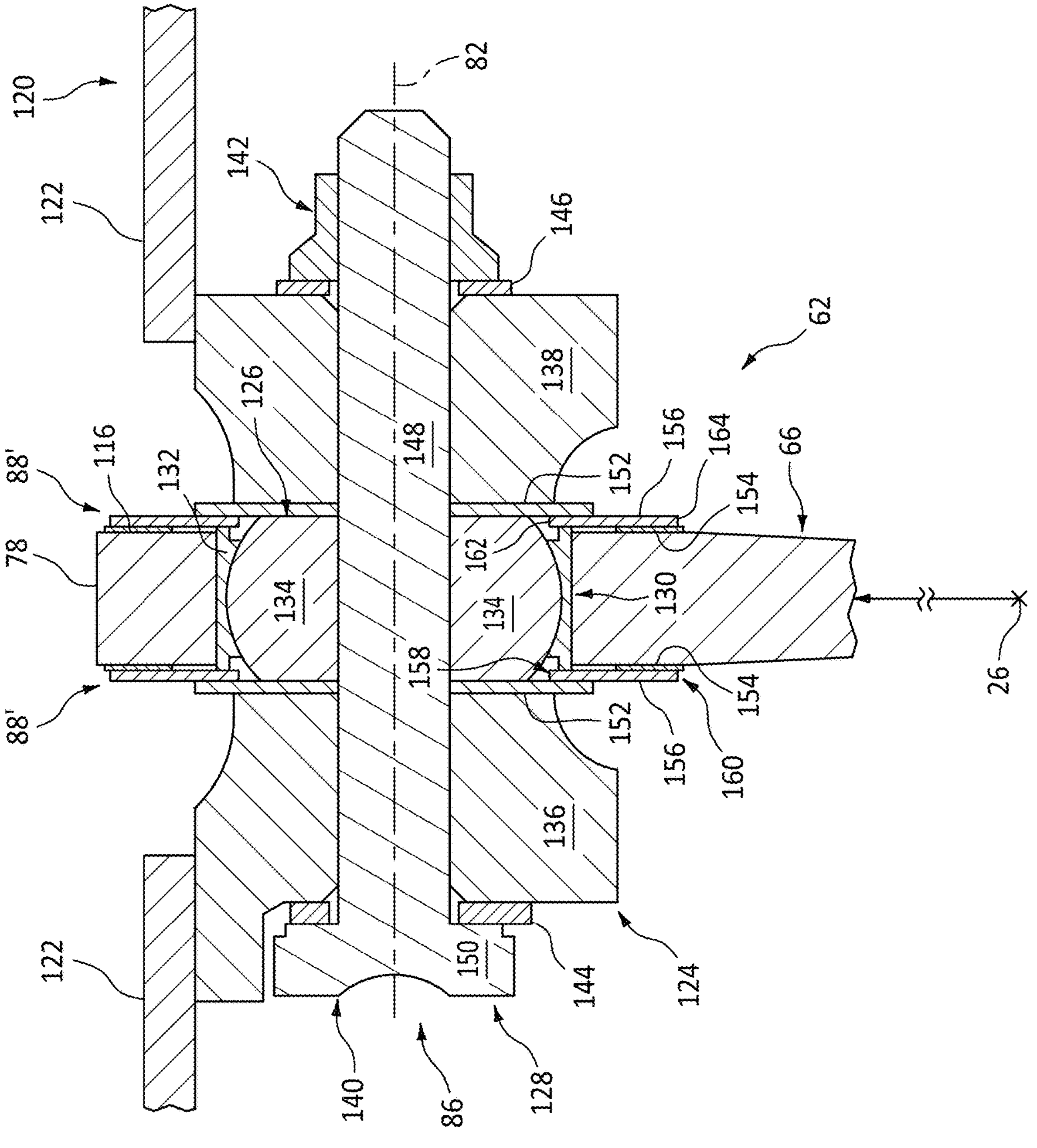
FIG. 10 is a partial sectional illustration of the thrust reverser with one or more annular dampers.

Each linkage damper 88' of FIG. 10 includes an inner ring 152 (e.g., a rigid inner spacer ring), an outer ring 154 (e.g., a rigid outer spacer ring) and a damper ring 156 (e.g., a flexible intermediate ring, an annular flex plate, etc.). Each of these damper members 152, 154, 156 may have an annular (e.g., washer like) body, and extends circumferentially around the respective outer pivot axis 82 and the associated fastener 140. The inner ring 152 and the outer ring 154 are stiff bodies; e.g., each ring 152, 154 may be a metal washer. By contrast, the damper ring 156 is a flexible, resilient body. The damper ring 156, for example, may be constructed from or otherwise include the elastomeric material. In another example, the damper ring 156 may be constructed from or otherwise include a thin, flexible piece of metal such as, but not limited to, steel, titanium (Ti) or Inconel metal. The damper ring 156 of FIG. 10 is disposed laterally (relative to the axis 26)/axially (relative to the respective outer pivot axis 82) between the inner ring 152 and the outer ring 154. The damper ring 156 is bonded (e.g., adhered, welded, brazed, etc.) and/or otherwise attached to the inner ring 152 and the outer ring 154 such that the damper ring 156 connects the inner ring 152 to the outer ring 154 and vice versa. Here, an inner radius of the outer ring 154 is sized larger than an outer radius of the inner ring 152, where the damper ring 156 bridges a radial gap between the inner ring 152 and the outer ring 154.

The inner ring 152 may be clamped axially between a respective one of the clevis flanges 136, 138 and the ball element 134. Here, the inner ring 152 of FIG. 10 contacts each of the elements 156, 134 and 136 or 138. The outer ring 154 may be abutted and pressed axially against the respective door actuation linkage 66. Here, the outer ring 154 of FIG. 10 contacts each of the elements 156 and 66. The damper ring 156 thereby (e.g., axially) engages the clevis mount 124 and its respective clevis flange 136, 138 through the inner ring 152. The damper ring 156 (e.g., axially) engages the respective door actuation linkage 66 through the outer ring 154. With this arrangement, the damper ring 156 is configured to resist (e.g., slight) movement between the inner ring 152 and the outer ring 154. The linkage damper 88' and its damper ring 156 may thereby be operable to damp vibrations in the respective door actuation linkage 66 at least at its linkage first end 78.

In some embodiments, referring to FIG. 10, a radial inner peripheral region 158 of the damper ring 156 may axially engage the ball element 134 through the inner ring 152. Similarly, a radial outer peripheral region 160 of the damper ring 156 may axially engage the respective door actuation linkage 66 through the outer ring 154. In other embodiments, referring to FIGS. 11 and 12, the inner peripheral region 158 of the damper ring 156 may alternatively directly engage (e.g., contact) the ball element 134. The damper ring 156 of FIGS. 11 and 12, for example, is axially abutted against the ball element 134. With the arrangement of FIG. 11, the inner ring 152 is disposed axially between the damper ring 156 and the respective clevis flange 136, 138. With the arrangement of FIG. 12, the inner ring is omitted.

Figure 13C:
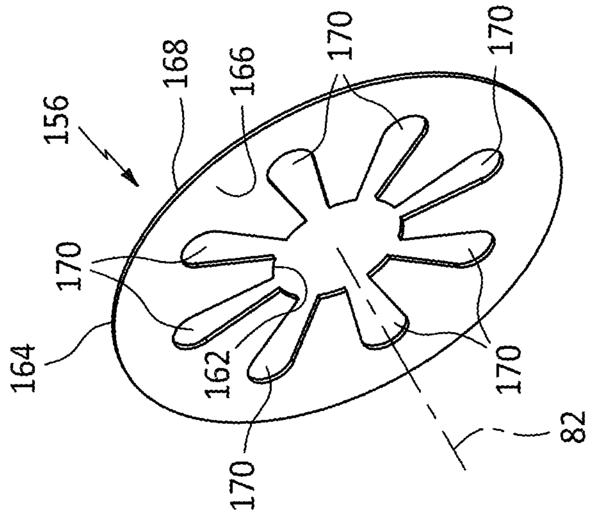
FIGS. 13A-C are perspective illustrations of various damper ring arrangements.
Figure 13B:
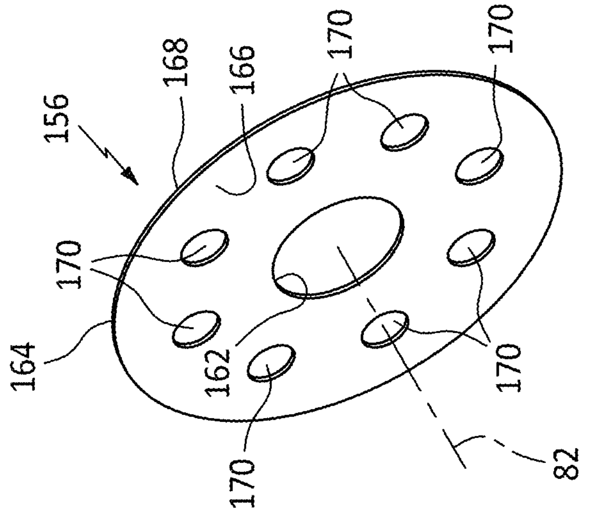
Figure 13A:
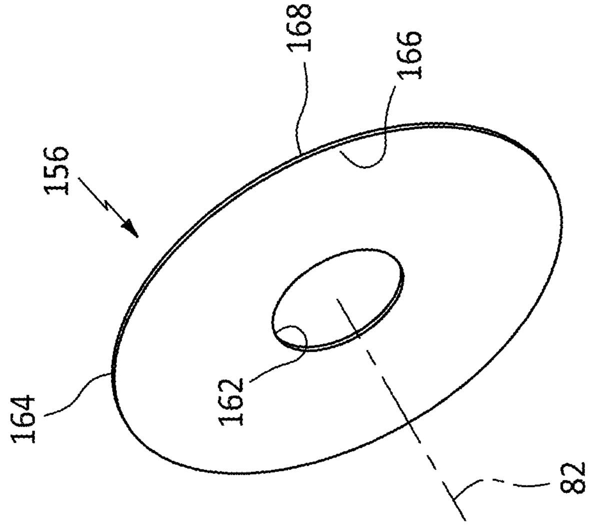

Referring to FIGS. 13A-C, the damper ring 156 extends radially between and to a radial inner end 162 of the damper ring 156 and a radial outer end 164 of the damper ring 156. The damper ring 156 extends axially between opposing axial sides 166 and 168 of the damper ring 156. The damper ring 156 extends circumferentially about (e.g., completely around) the pivot axis 82, configuring the damper ring 156 of FIGS. 13A-C as a full-hoop (e.g., annular) body.

In some embodiments, referring to FIG. 13A, the damper ring body may be radially and circumferentially uninterrupted. The damper ring 156 of FIG. 13A, for example, extends radially uninterrupted from the ring inner end 162 to the ring outer end 164. Here, the ring inner end 162 forms a circular inner edge of the damper ring 156, and the ring outer end 164 forms a circular outer edge of the damper ring 156. The damper ring 156 of FIG. 13A also extends uninterrupted circumferentially around the pivot axis 82.

In some embodiments, referring to FIGS. 13B and 13C, the damper ring 156 may be circumferentially and/or radially interrupted by one or more apertures 170; e.g., through-holes, slots, grooves, etc. The apertures 170 of FIGS. 13B and 13C are arranged and may be equispaced circumferentially around the pivot axis 82 in an annular array; e.g., a circular array. Each of the apertures 170 of FIG. 13B is configured as a through-hole. Each aperture 170 of FIG. 13B, for example, is disposed radially within the damper ring 156 and extends axially through the damper ring 156 between the opposing axial sides 166 and 168. By contrast, each of the apertures 170 of FIG. 13C is configured as a slot. Each aperture 170 of FIG. 13A, for example, extends axially through the damper ring 156 between the opposing axial sides 166 and 168. Each aperture 170 of FIG. 13C also projects radially (e.g., outward away from the pivot axis 82) into the damper ring 156 from the ring inner end 162 to a distal end of the respective aperture 170. The ring inner end 162 of FIG. 13C may thereby have a scalloped and/or castellated geometry.

Figure 12:
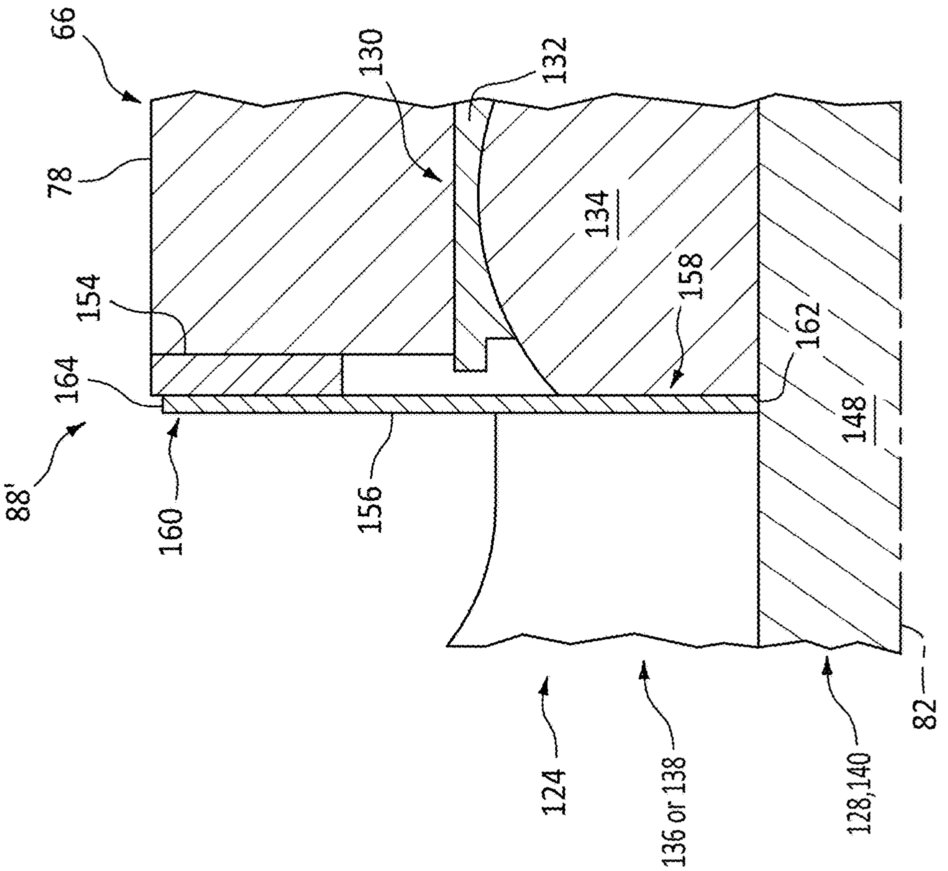
FIGS. 11 and 12 are partial sectional illustrations of the thrust reverser with various other damper arrangements.
Figure 11:
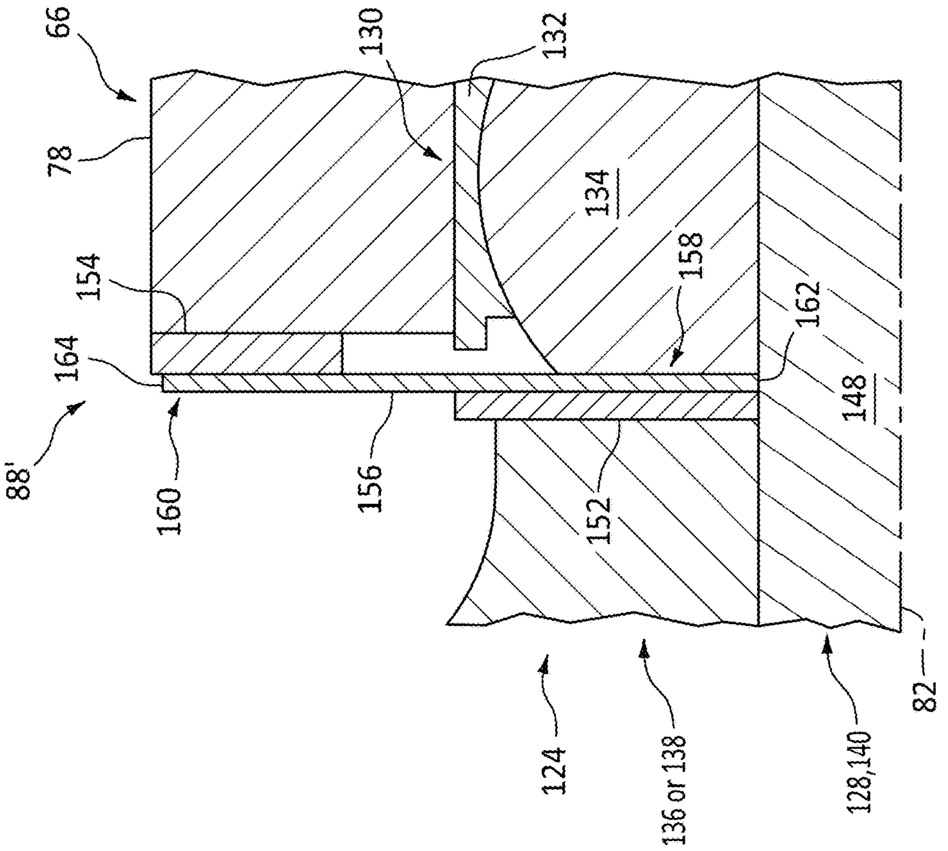

While the linkage dampers 88' of FIGS. 10-12 are described above with respect to use in the blocker door assemblies 62, the present disclosure is not limited thereto. One or more of the linkage dampers 88', for example, may alternatively be arranged with any other linkage/link of an aircraft which may be subject to vibrations. For example, one or more of the linkage dampers 88' may be arranged with an end of a linear actuator; e.g., a piston, etc. In another example, referring to FIG. 14, a set of the linkage dampers 88A may be arranged at a connection between a mounting linkage 66' and an engine case 172. More particularly, the fastener 140A mounts the ball element 134A to a set of the clevis flanges 136A and 138A, which clevis flanges 136A and 138A are connected to the engine case 172. Another set of the set of the linkage dampers 88B may also or alternatively be arranged at a connection between the mounting linkage 66' and an engine pylon 174. More particularly, the fastener 140B mounts the ball element 134B to a set of the clevis flanges 136B and 138B, which clevis flanges 136B and 138B are connected to the engine pylon 174. Here, the mounting linkage 66' facilitates mounting the engine case 172 to the engine pylon 174.

Figure 14:
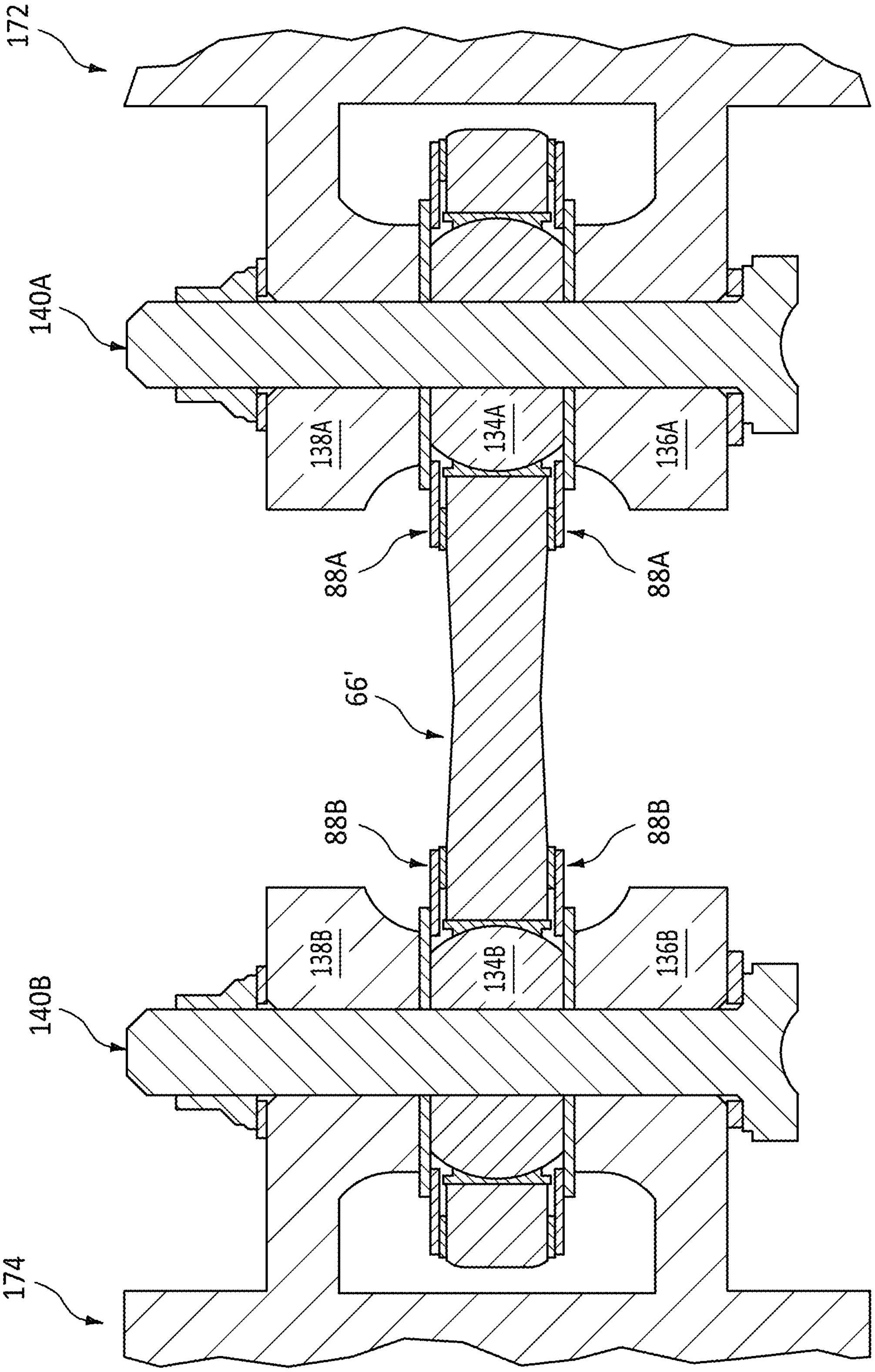
FIG. 14 is a partial sectional illustration of a connection between an engine case and an engine pylon.

While the mounting linkage 66' is shown in FIG. 14 with spherical bearings at both of its ends, the present disclosure is not limited to such an exemplary arrangement. It is contemplated, for example, one end of the mounting linkage 66' may alternatively be mounted to the engine case 172 or the engine pylon 174 using another mounting arrangement.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft, comprising:

a link extending longitudinally from a first end of the link to a second end of the link, the link comprising a receptacle at the first end of the link;

a spherical bearing disposed within the receptacle, the spherical bearing including a race element and a ball element, the race element axially aligned with the ball element along an axis, the race element circumscribing the ball element, and the race element radially between and engaging the ball element and the link;

a damper including a damper ring and an outer spacer ring that is bonded to the damper ring, the damper ring axially engaging the ball element at an inner peripheral region of the damper ring, and the damper ring axially engaging the link at an outer peripheral region of the damper ring through the outer spacer ring; and a fastener projecting through the spherical bearing and the damper.

2. The apparatus of claim 1, wherein the damper ring comprises elastomeric material.

3. The apparatus of claim 1, wherein the damper ring comprises metal.

4. The apparatus of claim 1, wherein the damper ring extends uninterrupted radially from an inner end of the damper ring to an outer end of the damper ring; and the damper ring extends uninterrupted circumferentially around the axis.

5. The apparatus of claim 1, wherein the damper ring includes a plurality of apertures arranged circumferentially about the axis.

6. The apparatus of claim 5, wherein a first of the plurality of apertures is disposed radially within and extends axially through the damper ring.

7. The apparatus of claim 5, wherein a first of the plurality of apertures projects radially into and extends axially through the damper ring at the inner peripheral region of the damper ring.

8. The apparatus of claim 1, wherein the outer spacer ring is axially between and abutted against the link and the outer peripheral region of the damper ring.

9. The apparatus of claim 1, wherein the inner peripheral region of the damper ring is abutted against the ball element.

10. The apparatus of claim 1, wherein the damper further includes an inner spacer ring bonded to the damper ring; and the damper ring axially engages the ball element at the inner peripheral region of the damper ring through the inner spacer ring.

11. The apparatus of claim 10, wherein the inner spacer ring is axially between and abutted against the ball element and the inner peripheral region of the damper ring.

12. The apparatus of claim 10, wherein at least one of the outer spacer ring or the inner spacer ring comprises metal.

13. The apparatus of claim 10, wherein an inner diameter of the outer spacer ring is larger than an outer diameter of the inner spacer ring.

14. The apparatus of claim 1, wherein the outer spacer ring comprises metal.

15. The apparatus of claim 1, further comprising:

a thrust reverser blocker door;

the fastener mounting the ball element to the thrust reverser blocker door.

16. The apparatus of claim 1, further comprising:

an engine case;

the fastener mounting the ball element to the engine case.

17. The apparatus of claim 1, further comprising:

an engine pylon;

the fastener mounting the ball element to the engine pylon.

18. An apparatus for an aircraft, comprising:

a link extending longitudinally from a first end of the link to a second end of the link, the link comprising a receptacle at the first end of the link;

a spherical bearing disposed within the receptacle, the spherical bearing including a race element and a ball element, and the race element circumscribing the ball element and radially engaging the link;

a damper including an inner ring, an outer ring and an intermediate ring connecting the inner ring to the outer ring, the inner ring abutted against the ball element, the outer ring abutted the link, and the intermediate ring comprising elastomeric material; and a fastener projecting through the spherical bearing and the damper.

19. An apparatus for an aircraft, comprising:

a link extending longitudinally from a first end of the link to a second end of the link, the link comprising a receptacle at the first end of the link;

a spherical bearing disposed within the receptacle, the spherical bearing including a race element and a ball element, the race element axially aligned with the ball element along an axis, the race element circumscribing the ball element, and the race element radially between and abutted against the ball element and the link;

a damper including a damper ring and an outer spacer ring that is welded to the damper ring, the damper ring axially engaging the ball element independent of the outer spacer ring, and the damper ring axially engaging the link through the outer spacer ring; and a fastener projecting through the spherical bearing and the damper.

20. The apparatus of claim 19, wherein the damper further includes an inner spacer ring;

the damper ring axially engages the ball element through the inner spacer ring independent of the outer spacer ring; and the damper ring axially engages the link through the outer spacer ring independent of the inner spacer ring.

* * * * *